(12) United States Patent
Harer et al.

(10) Patent No.: US 6,591,706 B2
(45) Date of Patent: Jul. 15, 2003

(54) RACK AND PINION STEERING GEAR WITH A UNITIZED YOKE ASSEMBLY

(75) Inventors: Dennis F. Harer, Kingsport, TN (US); William E. Allen, Jr., Kingsport, TN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/846,898

(22) Filed: May 1, 2001

(65) Prior Publication Data

US 2002/0162412 A1 Nov. 7, 2002

(51) Int. Cl.⁷ .............................................. F16H 1/04
(52) U.S. Cl. ............................................................ 74/422
(58) Field of Search ........................ 74/422, 409, 440, 74/388 PS; 384/37, 42

(56) References Cited

U.S. PATENT DOCUMENTS

| | | | |
|---|---|---|---|
| 5,022,279 A | | 6/1991 | Ueno et al. |
| 5,622,085 A | * | 4/1997 | Kostrzewa .................... 384/37 |
| 5,718,149 A | * | 2/1998 | Phillips ........................ 74/422 |
| 5,802,919 A | * | 9/1998 | Phillips ........................ 384/37 |
| 5,937,703 A | | 8/1999 | Engler |
| 6,067,713 A | * | 5/2000 | Bugosh ........................ 29/505 |
| 6,076,417 A | | 6/2000 | Engler |
| 6,119,540 A | * | 9/2000 | Phillips ........................ 384/42 |
| 6,142,031 A | | 11/2000 | Phillips |
| 6,286,382 B1 | * | 9/2001 | Spagnuolo et al. ......... 411/214 |

* cited by examiner

Primary Examiner—David A. Bucci
Assistant Examiner—Julie K. Smith
(74) Attorney, Agent, or Firm—Tarolli, Sundheim, Covell & Tummino L.L.P.

(57) ABSTRACT

A rack and pinion steering gear (10) comprises a housing (12) having an longitudinally extending passage (14). A yoke bore (22) extends perpendicular to the longitudinally extending passage (14) and connects with the longitudinally extending passage (14) within the housing (12). A pinion gear (20) is rotatably mounted in the housing (12). A rack bar (16) extends through the longitudinally extending passage (14) of the housing (12) and is movable relative to the pinion gear (20). The rack bar (16) has teeth in meshing engagement with the teeth (34) of the pinion gear (20). A yoke assembly (36) is located in the yoke bore (22) for at least partially supporting and guiding movement of the rack bar (16) relative to the pinion gear (20). The yoke assembly (36) includes a yoke (38), a yoke plug (42), and an elastomeric spring (40). The yoke (38) is axially spaced from the yoke plug (42) by the elastomeric spring (40). The elastomeric spring (40) is secured to the yoke (38) and to the yoke plug (42) so that the yoke (38), the elastomeric spring (40), and the yoke plug (42) form a unitized assembly.

7 Claims, 3 Drawing Sheets

RACK AND PINION STEERING GEAR WITH A UNITIZED YOKE ASSEMBLY

TECHNICAL FIELD

The present invention relates to a rack and pinion steering gear, and more particularly, to a rack and pinion steering gear with a unitized yoke assembly.

BACKGROUND OF THE INVENTION

A known rack and pinion steering gear includes a pinion gear that is rotatably mounted in a housing and is connected with a steering wheel of a vehicle. A rack bar extends through the housing and has opposite end portions connected with steerable vehicle wheels. Gear teeth formed on the rack bar are disposed in meshing engagement with gear teeth on the pinion gear. A yoke assembly is disposed in the housing to at least partially support and guide movement of the rack bar relative to the housing. The support provided by the yoke assembly helps to ensure proper lash between the gear teeth of the rack bar and the gear teeth of the pinion gear.

Known yoke assemblies include a yoke having an arcuate first surface for contacting and supporting the rack bar. A helical compression spring contacts a second surface of the yoke for biasing the yoke against the rack bar. The yoke is held in a yoke bore of the rack and pinion steering gear housing by a plug. The plug has external threads that screw into internal threads located in a yoke bore of the housing.

To install the known yoke assembly in the rack and pinion steering gear housing, the yoke is placed into the yoke bore such that the first surface of the yoke contacts the rack bar. The spring is inserted into a bore on a second surface of the yoke. The yoke plug is screwed a short distance into the yoke bore. Next, the rack and pinion steering gear is placed on a yoke set machine. The yoke set machine screws the plug into the yoke bore to set a proper clearance between the yoke and the plug. To set the proper clearance, the yoke set machine places known loads on the rack bar and based upon deflection of the rack bar correlates a clearance between the yoke and the plug. When a proper clearance exists between the yoke and the plug, the rack and pinion steering gear is removed from the yoke set machine and an adhesive is applied to lock the plug to the housing. The adhesive ensures that the clearance between the yoke and the plug is not later changed.

SUMMARY OF THE INVENTION

The present invention is a rack and pinion steering gear. The rack and pinion steering gear comprises a housing having a longitudinally extending passage. A yoke bore extends perpendicular to the longitudinally extending passage and connects with the longitudinally extending passage within the housing. A pinion gear is rotatably mounted in the housing. The pinion gear has teeth. A rack bar extends through the longitudinally extending passage of the housing and is movable relative to the pinion gear. The rack bar has teeth in meshing engagement with the teeth of the pinion gear. A yoke assembly is located in the yoke bore of the housing for at least partially supporting and guiding movement of the rack bar relative to the pinion gear. The yoke assembly includes a yoke, a yoke plug, and an elastomeric spring. The yoke is axially spaced from the yoke plug by the elastomeric spring. The elastomeric spring is secured to the yoke and to the yoke plug so that the yoke, the elastomeric spring, and the yoke plug form a unitized assembly.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
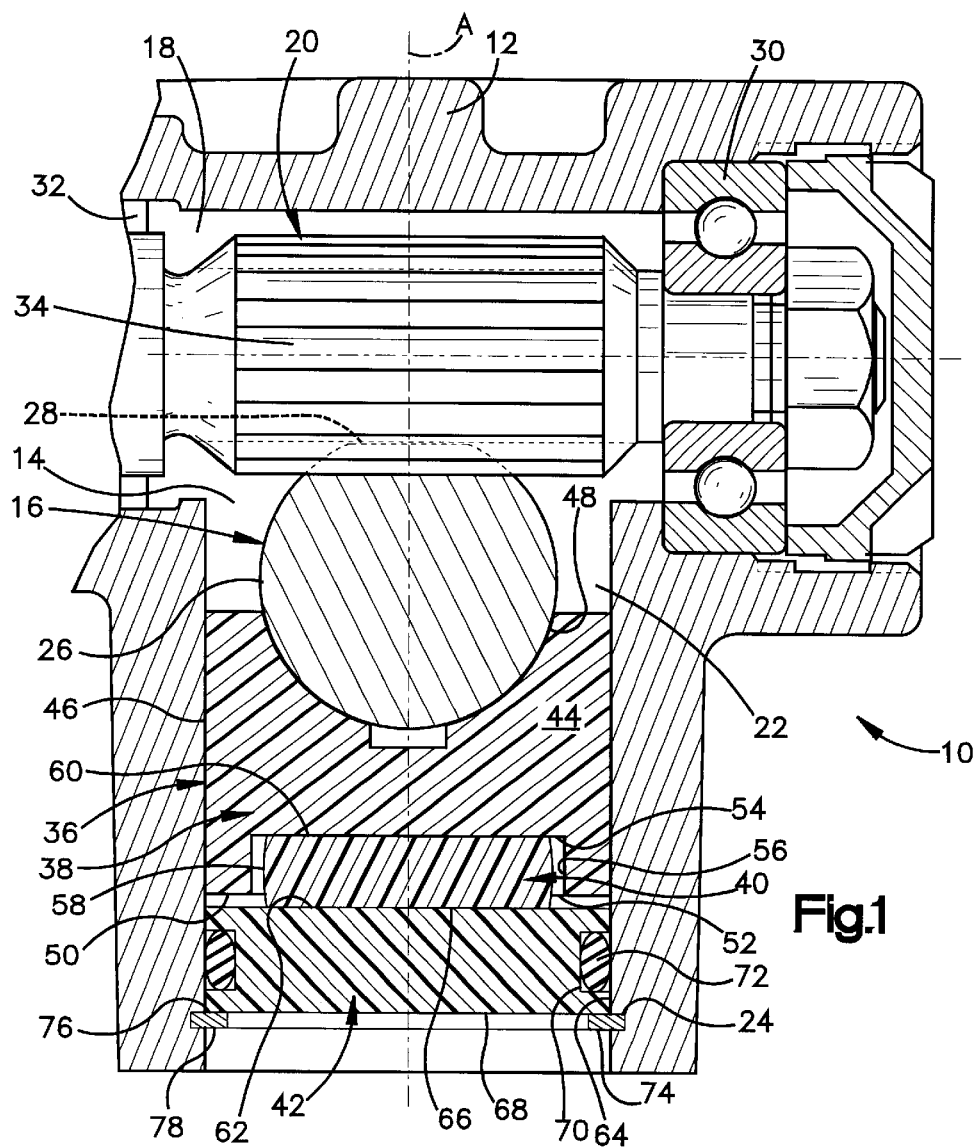
FIG. 1 is a schematic cross-sectional view of a rack and pinion steering gear constructed in accordance with the present invention.

A cross-sectional view of the rack and pinion steering gear 10 of the present invention is illustrated in FIG. 1. The rack and pinion steering gear 10 includes a housing 12. Preferably, the housing 12 is made of cast metal. The housing 12 includes a longitudinally extending passage 14 for receiving a rack bar 16. A passage 18 for receiving a pinion gear 20 extends into the housing 12 and tangentially intersects the longitudinally extending passage 14. A yoke bore 22 also extends perpendicular to the longitudinally extending passage 14 and connects with the longitudinally extending passage 14 within the housing 12. The yoke bore 22 connects with the longitudinally extending passage 14 on a side of the longitudinally extending passage 14 opposite from the pinion gear passage 18. The yoke bore 22 extends in a direction parallel to axis A, as shown in FIG. 1. The yoke bore 22 includes an annular groove 24 that extends into the housing 12.

A portion of a longitudinally extending rack bar 16 extends through the longitudinally extending passage 14 of the housing 12. The rack bar 16 has opposite end portions (not shown) that are connected to the steerable wheels (not shown) of the vehicle through tie rods (not shown). The rack bar 16 has a generally cylindrical main body 26. An upper surface 28 of the rack bar 16 has a plurality of teeth (not shown).

A pinion gear 20 is located in the pinion gear passage 18 of the housing 12. Two bearing assemblies 30 and 32 rotatably support the pinion gear 20 in the housing 12. The first bearing assembly 30 is located at one end of the pinion gear 20. A second bearing assembly 32 is located at an opposite end of the pinion gear 20. The pinion gear 20 includes a plurality of teeth 34. The plurality of teeth 34 of the pinion gear 20 is disposed in meshing engagement with the plurality of teeth of the rack bar 16.

A yoke assembly 36, constructed in accordance with the present invention, is located within the yoke bore 22 of the housing 12. The yoke assembly 36 at least partially supports and guides movement of the rack bar 16 relative to the housing 12 and relative to the pinion gear 20.

Figure 2:
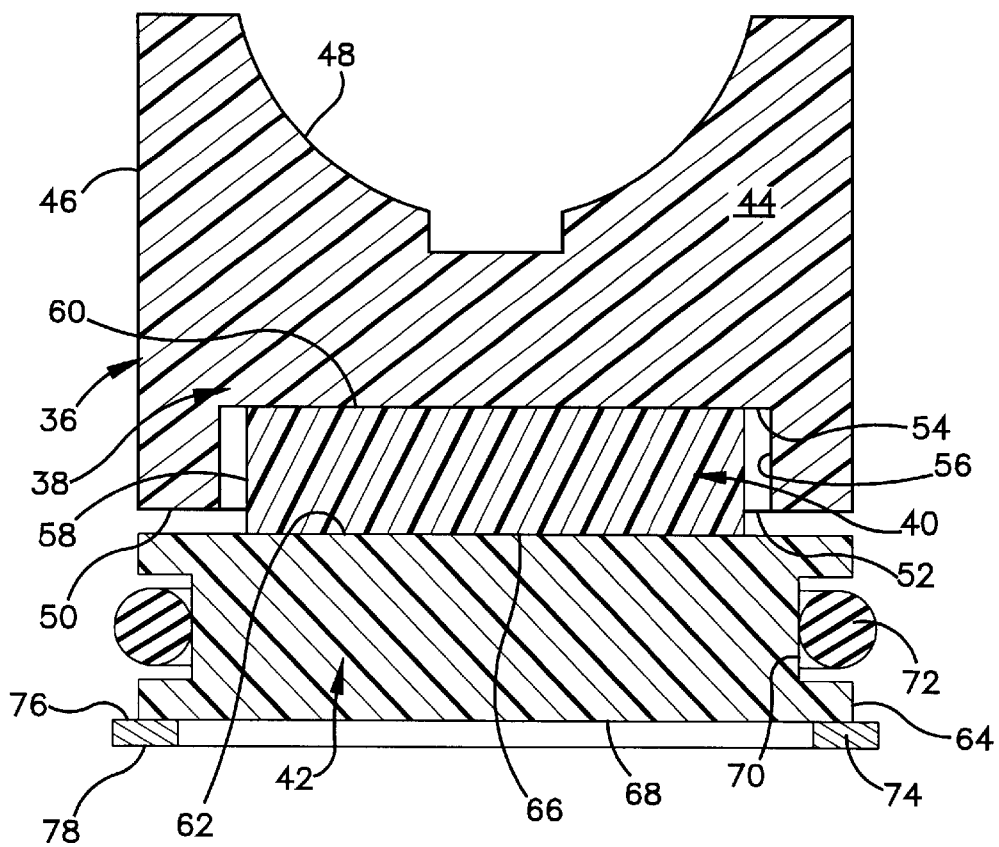
FIG. 2 is an enlarged view of a yoke assembly of the rack and pinion steering gear of FIG. 1.

As shown in FIG. 2, the yoke assembly 36 includes a yoke 38, an elastomeric spring 40, and a yoke plug 42. The yoke 38 has a cylindrical main body portion 44. The cylindrical main body portion 44 includes a cylindrical sidewall 46 and axially opposite first and second end surfaces 48 and 50, respectively. The cylindrical sidewall 46 extends parallel to axis A and is centered on axis A.

The first end surface 48 of the yoke 38 is arcuate. The arc of the first end surface 48 is sized to receive a portion of the cylindrical main body 26 of the rack bar 16. The first end surface 48 of the yoke 38 acts as a bearing surface and at least partially supports and guides movement of the rack bar 16.

The second end surface 50 of the yoke 38 is flat and extends in a direction perpendicular to the sidewall 46 of the yoke 38, i.e., transverse to axis A. A centrally located bore 52 extends axially into the second end surface 50 of the yoke 38. The bore 52 extends approximately one-third of the distance between the second end surface 50 of the yoke 38 and the first end surface 48 of the yoke 38. The bore 52 has a diameter that is approximately seventy-five percent of the diameter of the main body portion 44 of the yoke 38. The bore 52 terminates at an inner end surface 54 and includes a cylindrical sidewall 56. The inner end surface 54 extends perpendicular to axis A and the sidewall 56 extends parallel to and is centered on axis A.

The elastomeric spring 40 of the yoke assembly 36 is also cylindrical and has a diameter that is approximately eighty-five percent of the diameter of the bore 52 in the second end surface 50 of the yoke 38. The elastomeric spring 40 has a sidewall 58 that extends between a first end surface 60 and a second end surface 62. Both the first end surface 60 and the second end surface 62 of the elastomeric spring 40 are flat. As shown in FIG. 2, the sidewall 58 of the elastomeric spring 40 extends parallel to axis A and the first and second end surfaces 60 and 62 both extend perpendicular to axis A. The axial length of the elastomeric spring 40, along axis A, is defined as the distance between the first end surface 60 and the second end surface 62 of the elastomeric spring 40. The elastomeric spring 40 has an axial length that is greater than the depth of the bore 52 that extends into the second end surface 50 of the yoke 38.

The yoke assembly 36 further includes a yoke plug 42 for closing the yoke bore 22 in the housing 12. The yoke plug 22 is cylindrical and has a diameter that is slightly smaller than the diameter of the yoke bore 22 in the housing 12. The yoke plug 42 includes a cylindrical sidewall 64 and axially opposite first and second end surfaces 66 and 68, respectively. The sidewall 64 of the yoke plug 42 extends parallel to axis A. A circumferential groove 70 extends into the sidewall 64 of the yoke plug 42. The circumferential groove 70 is sized for receiving an O-ring 72. The first end surface 66 and the second end surface 68 of the yoke plug 42 are flat and extend perpendicular to axis A.

The rack and pinion steering gear 10 also includes a retaining ring 74 for retaining the yoke assembly 36 in the yoke bore 22 of the housing 12. The retaining ring 74 is an annular ring and includes a slot (not shown) for allowing the retaining ring 74 to be compressed. The retaining ring 74 has flat upper and lower surfaces 76 and 78, respectively. An inner diameter of the retaining ring 74, in a non-compressed state, is less than a diameter of the yoke plug 42. An outer diameter of the retaining ring 74, in a non-compressed state, is greater than the diameter of the yoke bore 22 in the housing 12.

Preferably, the yoke 38 and the yoke plug 42 of the yoke assembly 36 are formed from either polyethylene terephthalate or polybutylene terephthalate. A preferred material that may be used for the yoke 38 and the yoke plug 42 includes 32% glass reinforced polybutylene terephthalate, 3% PTFE, and 2% silicon lubricated resin. Other materials that may be used for the yoke 38 and the yoke plug 42 include as VALOX, which is commercially available from General Electric Company, and CRASTIN, which is commercially available from E.I. DuPont de Nemours & Co. Preferably, the elastomeric spring 40 is formed from a hydrogenated nitrile-butyl rubber (HNBR) number 752 (ASTM D-1418), which is commercially available from Bayer Aktiengesellschaft of Leverkusen, Germany.

The yoke assembly 36 is formed as a unitized assembly. Thus, the elastomeric spring 40 is secured to the yoke 38. The elastomeric spring 40 is also secured to the yoke plug 42. In the unitized yoke assembly 36, the elastomeric spring 40 axially separates the yoke 38 from the yoke plug 42.

One method of manufacturing the unitized yoke assembly 36 is known as transfer molding. In this process, the yoke 38 and the yoke plug 42 are individually formed, preferably by injection molding. The inner end surface 54 of the yoke 38 and the first end surface 66 of the yoke plug 42 are coated with a known bonding agent. The yoke 38 and the yoke plug 42 are placed into a transfer molding machine and the elastomeric material for the elastomeric spring 40 is injected between the yoke 38 and the yoke plug 42. Next, the yoke 38, the yoke plug 42, and the elastomeric spring 40 are heated. The heat causes the bonding agent to adhere the first end surface 66 of the elastomeric spring 40 to the inner end surface 54 of the yoke 38. The heat also causes the bonding agent to adhere the second end surface of the spring 40 to the first end surface 66 of the yoke plug 42.

After the yoke assembly 36 is fabricated, the unitized yoke assembly 36 is removed from the molding machine. An O-ring 72 is inserted into the circumferential groove 70 in the sidewall 64 of the yoke plug 42. The O-ring 72 should have a diameter that is larger than the depth of the circumferential groove 70 so that the O-ring 72 will deform to seal the yoke plug 42 against the yoke bore 22 when the yoke plug 42 is installed in the yoke bore 22. Those skilled in the art will recognize that instead of using a separate O-ring 72, a sealing surface may be integrally formed on the sidewall 64 of the yoke plug 42.

To assemble the rack and pinion steering gear 10 of the present invention, a portion of the rack bar 16 is extended through the longitudinally extending passage 14 of the housing 12. The pinion gear 20 is inserted into the housing 12 and the teeth 34 of the pinion gear 20 and the teeth of the rack bar 16 are placed in meshing engagement. The unitized yoke assembly 36 is inserted into the yoke bore 22 of the housing 12 such that the first end surface 48 of the yoke 38 enters the yoke bore 22 first. The yoke plug 42 is moved toward the rack bar 16 until the first end surface 48 of the yoke 38 to contact the rack bar 16. The yoke plug 42 is pressed toward the rack bar 16 until a preestablished force is reached.

Since the unitized yoke assembly 36 has known dimensions and the spring rate of the elastomeric spring 40 is known, the preestablished force is used to assure proper spacing between the yoke 38 and the yoke plug 42 in the assembled rack and pinion steering gear 10. By applying the preestablished force, the elastomeric spring 40 will compress a known amount, as shown in FIG. 1. By compressing the elastomeric spring 40 a known amount, the yoke 38 will apply a desired force to the rack bar 16 and a desired spacing will be established between the second end surface 50 of the yoke 38 and the first end surface 66 of the yoke plug 42 of the unitized yoke assembly 36. The desired spacing is typically 0.010 inches.

Once the preestablished force is applied to the yoke plug 42, the retaining ring 74 is inserted into the yoke bore 22 and locked in the annular groove 24 of the yoke bore 22 of the housing 12 such that the preestablished force is maintained. To allow for manufacturing tolerances, additional retaining rings may be used in a stack up manner to assure that the preestablished force is maintained. Thus, the yoke set machine used in the installation of the known yoke assemblies may be eliminated, as only a simple tool to measure the preestablished force on the yoke plug 42 is necessary.

During use of the rack and pinion steering gear 10 in a vehicle, varying loads are applied to the rack bar 16. A portion of the varying loads is transferred from the rack bar 16 to the yoke assembly 36. When the load transferred to the yoke assembly 36 increases, the yoke 38 moves toward the yoke plug 42 and the elastomeric spring 40 is compressed. Since the desired spacing separates the yoke 38 and the yoke plug 42, movement of the yoke 38 toward the yoke plug 42 is limited. Thus, the first end surface 66 of the yoke plug 42 acts as a stop for axial movement of the yoke 38. As the load of the rack bar 16 transferred to the yoke assembly 36 decreases, the elastomeric spring 40 expands and forces the yoke 38 away from the yoke plug 42.

Figure 3:
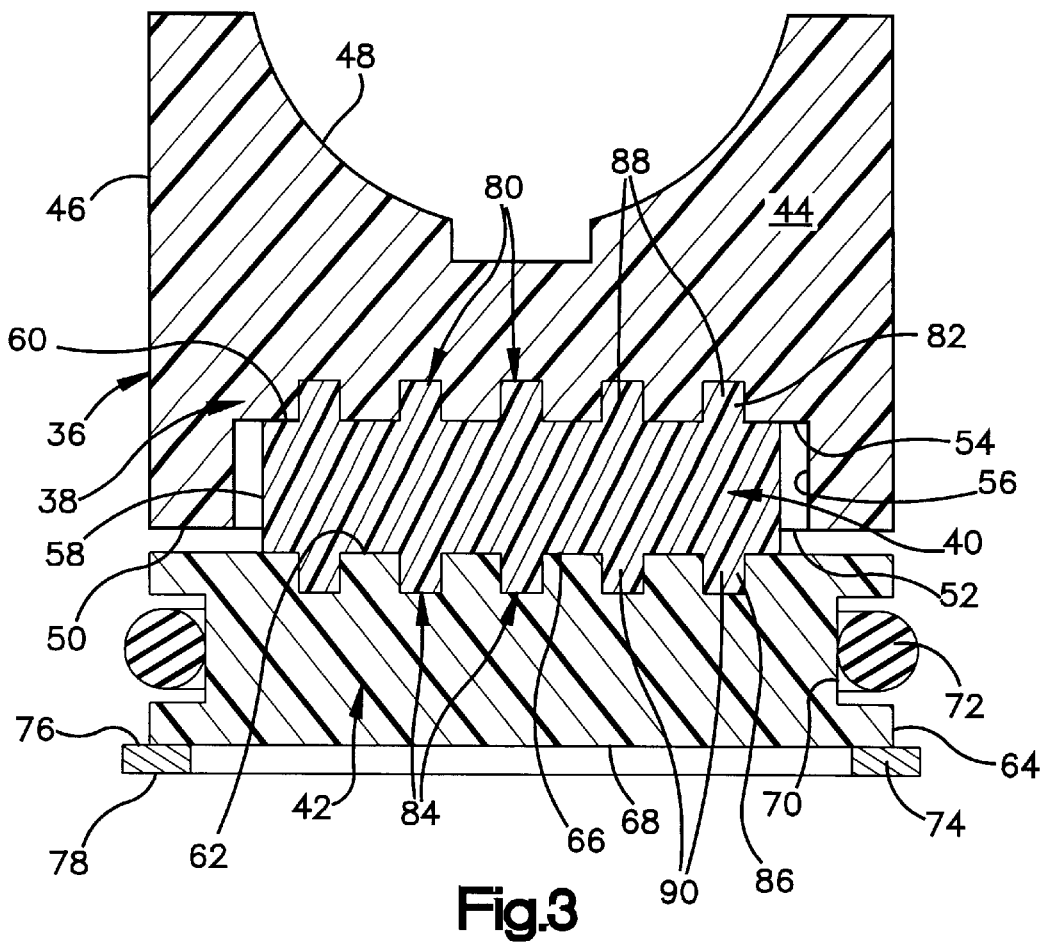
FIG. 3 is an enlarged view of an alternate yoke assembly for use in a rack and pinion steering gear constructed in accordance with the present invention.

FIG. 3 is an enlarged view of an alternate yoke assembly for use in a rack and pinion steering gear constructed in accordance with the present invention. Structure of FIG. 3 that is similar to that illustrated in FIG. 2 will be identified using the same reference number.

As shown in FIG. 3, the inner end surface 54 of the yoke 38 includes a plurality of interlocking features 80. The interlocking features 80 comprise blind holes 82 that extend axially into the inner end surface 54 of the yoke 38. Each blind hole 82 has an axial length of approximately one-quarter of the distance between the first end surface 48 of the yoke 38 and the inner end surface 54 and a diameter that is approximately equal to its axial length.

The first end surface 66 of the yoke plug 42 also includes a plurality of interlocking features 84. The interlocking features 84 comprise blind holes 86 that extend axially into the first end surface 66 of the yoke plug 42. Each blind hole 86 has an axial length of approximately one-quarter of the distance between the first end surface 66 of the yoke plug 42 and the second end surface 68 of the yoke plug 42.

The yoke assembly 36, illustrated in FIG. 3, also is formed as a unitized assembly. Thus, the elastomeric spring 40 is secured to the yoke 38. The elastomeric spring 40 is also secured to the yoke plug 42. In the unitized yoke assembly 36, the elastomeric spring 40 axially separates the yoke 38 from the yoke plug 42.

The unitized yoke assembly 36 of FIG. 3 may be injection molded. Preferably, a two shot injection molding process is used to manufacture the unitized yoke assembly 36. The first shot forms the yoke 38 and the yoke plug 42. The second shot is elastomeric material for the elastomeric spring 40. The elastomeric material is injected into a space between the yoke 38 and the yoke plug 42. The elastomeric material flows into the blind holes 82 in the yoke 38 and into the blind holes 86 in the yoke plug 42. The elastomeric material that flows into the blind holes 82 in the yoke 38 creates a first plurality of protrusions 88 extending axially outwardly of the first end surface 60 of the elastomeric spring 40. The elastomeric material that flows into the blind holes 86 in the yoke plug 42 creates a second plurality of protrusions 90 extending axially outwardly of the second end surface 62 of the elastomeric spring 40. The yoke 38, the yoke plug 42, and the elastomeric spring 40 are heated. The heat caused the elastomeric material of the elastomeric spring 40 to expand and solidify. As a result, an interference fit secures the first plurality of protrusions 88 in the blind holes 82 of the yoke 38 and an interference fit secures the second plurality of protrusions 90 in the blind holes 86 of the yoke plug 42.

Since the unitized yoke assembly 36 is of known dimensions and the spring rate of the elastomeric spring 40 is known, a preestablished force may be used to install the unitized yoke assembly 36 in the yoke bore 22 of the rack and pinion gear housing 12 to create a desired spacing between the yoke 38 and the yoke plug 42.

In addition to simplifying the installation of the yoke assembly 36 in the rack and pinion steering gear 10, the yoke assembly 36 of the present invention provides other advantages over known yoke assemblies. Since the elastomeric spring 40 of the yoke assembly 36 is molded to the yoke 38, rocking movement of the yoke 38 during movement of the rack bar 16 relative to the yoke assembly 36 is minimized. The increased area of the elastomeric elastomeric spring 40, as compared to the helical spring of known yoke assemblies, also helps to dampen noise caused by movement of the yoke 38 relative to the yoke plug 42. Moreover, the O-ring 72, which is inserted into the groove 70 in the sidewall 64 of the yoke plug 42, creates a seal between the yoke plug 42 and the yoke bore 22 of the housing 12. As a result, lubricating fluid in the housing 12 is prevented from escaping the housing 12 through the yoke bore 22. Also, the O-ring 72 prevents moisture and the like from entering the housing 12.

From the above description of the invention, those skilled in the art will perceive improvements, changes and modifications. Such improvements, changes and modifications within the skill of the art are intended to be covered by the appended claims.

Having described the invention, the following is claimed:

1. A rack and pinion steering gear comprising:

a housing having a longitudinally extending passage and a yoke bore that extends perpendicular to the longitudinally extending passage and connects with the longitudinally extending passage within the housing;

a pinion gear rotatably mounted in the housing, the pinion gear having teeth;

a rack bar extending through the longitudinally extending passage of the housing and being movable relative to the pinion gear, the rack bar having teeth in meshing engagement with the teeth of the pinion gear; and a yoke assembly located in the yoke bore of the housing for at least partially supporting and guiding movement of the rack bar relative to the pinion gear, the yoke assembly including a yoke, a yoke plug, and an elastomeric spring, the yoke being axially spaced from the yoke plug by the elastomeric spring, the elastomeric spring being secured to the yoke and the elastomeric spring being secured to the yoke plug so that the yoke, the elastomeric spring, and the yoke plug form a unitized assembly;

the elastomeric spring being adhered to both the yoke and the yoke plug;

a bonding agent being interposed between the elastomeric spring and the yoke and between the elastomeric spring and the yoke plug; and the bonding agent adhering the elastomeric spring to both the yoke and the yoke plug.

2. A rack and pinion steering gear comprising:

a housing having a longitudinally extending passage and a yoke bore that extends perpendicular to the longitudinally extending passage and connects with the longitudinally extending passage within the housing;

a pinion gear rotatably mounted in the housing, the pinion gear having teeth;

a rack bar extending through the longitudinally extending passage of the housing and being movable relative to the pinion gear, the rack bar having teeth in meshing engagement with the teeth of the pinion gear; and a yoke assembly located in the yoke bore of the housing for at least partially supporting and guiding movement of the rack bar relative to the pinion gear, the yoke assembly including a yoke, a yoke plug, and an elastomeric spring, the yoke being axially spaced from the yoke plug by the elastomeric spring, the elastomeric spring being secured to the yoke and the elastomeric spring being secured to the yoke plug so that the yoke, the elastomeric spring, and the yoke plug form a unitized assembly;

the yoke including a plurality of interlocking features, the yoke plug including a plurality of interlocking features, and the elastomeric spring including a first portion for interlocking with the interlocking features of the yoke and a second portion for interlocking with the interlocking features of the yoke plug.

3. A rack and pinion steering gear comprising:

a housing having a longitudinally extending passage and a yoke bore that extends perpendicular to the longitudinally extending passage and connects with the longitudinally extending passage within the housing;

a pinion gear rotatably mounted in the housing, the pinion gear having teeth;

a rack bar extending through the longitudinally extending passage of the housing and being movable relative to the pinion gear, the rack bar having teeth in meshing engagement with the teeth of the pinion gear; and a yoke assembly located in the yoke bore of the housing for at least partially supporting and guiding movement of the rack bar relative to the pinion gear, the yoke assembly including a yoke, a yoke plug, and an elastomeric spring, the yoke being axially spaced from the yoke plug by the elastomeric spring, the elastomeric spring being secured to the yoke and the elastomeric spring being secured to the yoke plug so that the yoke, the elastomeric spring, and the yoke plug form a unitized assembly;

the unitized assembly being insertable as one unit into the yoke bore of the housing during assembly of the steering gear.

4. A rack and pinion steering gear as set forth in claim 3 wherein the unitized assembly of the yoke, the elastomeric spring, and the yoke plug is insertable by sliding into the yoke bore of the housing without rotating during assembly of the steering gear.

5. A rack and pinion steering gear as set forth in claim 3 wherein the yoke has an arcuate end surface for engaging a cylindrical surface of the rack bar to act as a bearing surface and at least partially support and guide movement of the rack bar, the unitized assembly being insertable as one unit into the yoke bore of the housing during assembly of the steering gear to place the arcuate end surface of the yoke in abutting engagement with the cylindrical surface of the rack bar.

6. A rack and pinion steering gear as set forth in claim 3 wherein the yoke, the elastomeric spring, and the yoke plug are fixed for movement with each other as one unit after manufacture of the unitized assembly and prior to assembly of the unitized assembly into the steering gear.

7. A rack and pinion steering gear as set forth in claim 3 wherein the unitized assembly includes means separate from the housing for fixing the yoke, the elastomeric spring, and the yoke plug for movement with each other as one unit.

* * * * *